P. H. MELVILLE.
CHECK SYSTEM FOR FREIGHT HANDLING.
APPLICATION FILED JULY 30, 1917.
1,278,972.
Patented Sept. 17, 1918.
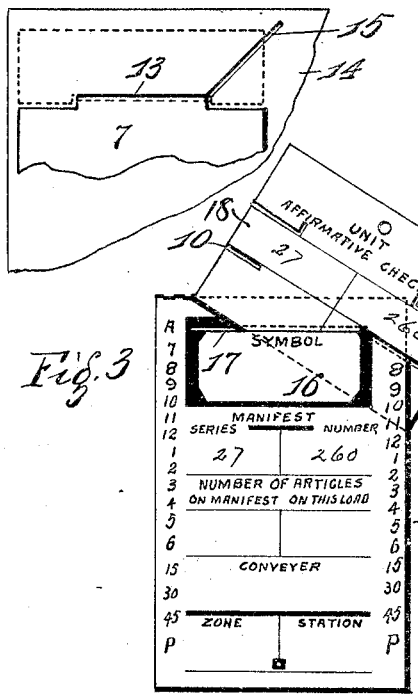

UNITED STATES PATENT OFFICE.

PATRICK H. MELVILLE, OF ST. LOUIS, MISSOURI.

CHECK SYSTEM FOR FREIGHT-HANDLING.

1,278,972.  Specification of Letters Patent.  Patented Sept. 17, 1918.

Application filed July 30, 1917. Serial No. 183,528.

*To all whom it may concern:*

Be it known that I, PATRICK H. MELVILLE, a citizen of the United States, and resident of St. Louis, Missouri, have invented certain new and useful Improvements in Check Systems for Freight-Handling, of which the following is a specification.

This invention relates to improvements in a check system for freight handling, and has for its object a check or ticket the face of which is printed, spaced and divided in such manner as to provide an absolute safeguard and perfect check on all freight handled at depots, stations, ware-houses or similar places.

A further object is to construct a ticket or check handled by the truck-man or other person in charge, said check or ticket being so arranged that when properly filled out by the check clerk will act as an absolute preventive from the car leaving for its destination without all of the articles assigned to said destination being placed in the car.

A further object of my invention is to construct a check which may be separated at a given point, a stub retained in the office and the body portion assigned to the truckman or placed in the car, the check provided with means whereby the two parts may be again attached together when the body portion has been returned to the office and a means also provided whereby the connected check may be attached to the bill of lading or dray ticket.

A further object is to provide a check which will act as absolute preventive from errors being made and freight becoming misplaced or assigned to the wrong car and likewise does away with the follow up or check system to ascertain whether or not the articles assigned to a certain destination are all delivered to the same car.

Figure 1, is a plan view of my complete check.

Fig. 2, is a similar view to Fig. 1, showing the ticket separated.

Fig. 3, is a view showing the stub and body portion in the act of being connected together or interlocked.

Fig. 4, is a view showing the two parts attached together and interlocked.

Fig. 5, is a view of a bill of lading or dray ticket showing the manner in which the ticket is attached thereto for filing purpose.

The ticket is constructed of a strip of material of a reasonable thickness convenient for handling, the face of which is spaced and printed and in these spaces are to be written certain numbers, dates, names and the like as will be fully hereinafter described.

The ticket is provided with a score or perforated line 6 at which point the same may be separated dividing the ticket into a stub 7, and a body portion 8. The stub portion 7, is provided with a long slit 9 and a short slit 10, and is also provided with slits 11 terminating into a short rectangular slit 12; the purpose of these two slits is to permit the stub to be inserted in the slit 13 formed in the bill of lading or dray ticket 14, this slit radiates upwardly at an angle as that indicated by the numeral 15, which is so arranged for the purpose to allow the upper portion of the stub to be inserted in the slit, and when inserted will assume the position as shown by dotted lines in Fig. 5. This will retain the check intact with the bill of lading or dray ticket for filing purposes.

In the body portion and within the rectangular space 16 is formed a slit 17. This slit is for the purpose to allow the body portion of the stub to be inserted therein in the manner as that shown in Figs. 3 and 4, and when inserted will connect the stub with the body portion and the two become interlocked. The object of the long slit 9 is to allow the stub when first inserted in the slit 17 to be slid to one side sufficiently to allow the opposite covering of the stub to pass downwardly through the slit 17, then the stub is shifted to the opposite side which brings the stub and body portion in proper alinement with each other then assuming the position as shown in Fig. 4.

The body portion of the ticket is provided near its top with a rectangular space 16, in which is imprinted the word "Symbol" and in which is to be written, stenciled, or otherwise marked, numbers or letters or combination thereof designating a place to which traffic is to be conveyed by truck.

Beneath this space is imprinted the word "Manifest" to the left thereof the word "Series" and to the right the word "Number", the word "Manifest" meaning the shipping ticket, bill of lading, way-bill or transfer slip. The word "Series" at the left of "Manifest" indicates that in the space beneath the word "Series" is placed a letter or number assigned to the check unit and prefixed to manifest number to identify individual performance and to provide a classification system based thereon.

To the right of "Manifest" is the word "Number" and in this space is placed a progressive number assigned consecutively to each shipment handled and inserted accordingly in the manifest covering. Beneath these spaces are the words "Number of articles," at the left under these words are the words "On manifest" and at the right "On this load." At the left column under "On manifest" is placed the total number of articles listed. On the right under "On this load" is placed the number of articles of each shipment conveyed in one load.

Beneath this on the ticket is imprinted the word "Conveyer" and beneath it is to be inserted the number or series or letters or both indicating the one who or that which conveys freight to the symbol indicated.

On the ticket beneath this space and to the left is printed the word "Zone" and to the right the word "Station." In the space beneath "Zone" is to be inserted one or more stations comprising a unit designated by number to which freight is loaded in the same car. In the space beneath station is to be inserted a place to which freight is loaded designated by a zone station number.

On the top of the ticket is an opening or perforation by which the ticket or stub when removed from the body may be placed on file until the return of the body portion and when the body portion is returned to the office the clerk will locate the same by comparing the series number and the manifest number with the corresponding numbers which are placed in the spaces 18 and 19 of the stub. These two parts are then interlocked together as shown in Figs. 3 and 4, and then the interlocked ticket is inserted in the slit of the bill of lading or dray ticket as that shown in Fig. 5, and the same together with the bill of lading may be filed away for future reference, the ticket being at all times intact.

At the bottom of the ticket is imprinted a small square through which may be inserted a punch designating that the ticket is complete. On the left and right of the ticket and along each vertical margin is imprinted numbers A above the column indicating forenoon, and P beneath indicating afternoon; between the letters A and P are numbers which indicate the time the ticket is being used by the truckman and should it be in the forenoon the numbers on the left indicate the time articles are loaded onto the truck, then the A is punched and the number indicating the hour; if in the afternoon the P is punched and the number indicating the hour. The numbers on the right indicate the time articles are loaded from the truck. The arrangement being identical as the numbers on the left.

In this arrangement of a check it would be utterly impossible when various articles are loaded by the truck-man on the platform assigned to a certain place or zone to be forgotten or missed from being placed on the car as all of the articles so deposited on the platform to be shipped are marked on the ticket and the party when receiving the ticket will be reminded that a certain number of articles are to be loaded in the car. In this manner there will be less confusion and a safeguard against overlooking goods or placing the goods in the wrong car consigned to a different zone.

Having fully described my invention what I claim is:

1. A means employed in a check system for freight handling, comprising a check divided into a stub and a body portion, slits provided on the stub and body portion by which the stub may be inserted in the slit formed in the body portion and to become interlocked with the body portion, both the stub and body portion having divisions in which may be written letters, numbers, or names, substantially as specified.

2. A means employed in a check system for freight handling, comprising a ticket provided with a perforation across itself dividing the same into a body portion, and a stub, a slit formed in the body portion, a short and a long straight slit formed in the stub for permitting the stub to be inserted in the slit of the body portion and to be interlocked therewith and additional slits formed in the stub for attaching the top of the stub to a shipping ticket, both stub and body portion bearing like identifying data, substantially as specified.

In testimony whereof, I have signed my name to this specification, in presence of two subscribing witnesses.

PATRICK H. MELVILLE.

Witnesses:
 ALFRED A. EICKS,
 WALTER C. STEIN.